April 26, 1938.　　W. W. GARSTANG　　2,115,162
UNIVERSAL CONVERTER
Filed April 28, 1937　　2 Sheets-Sheet 1

INVENTOR.
William W. Garstang,
BY
Hood & Hahn.
ATTORNEYS.

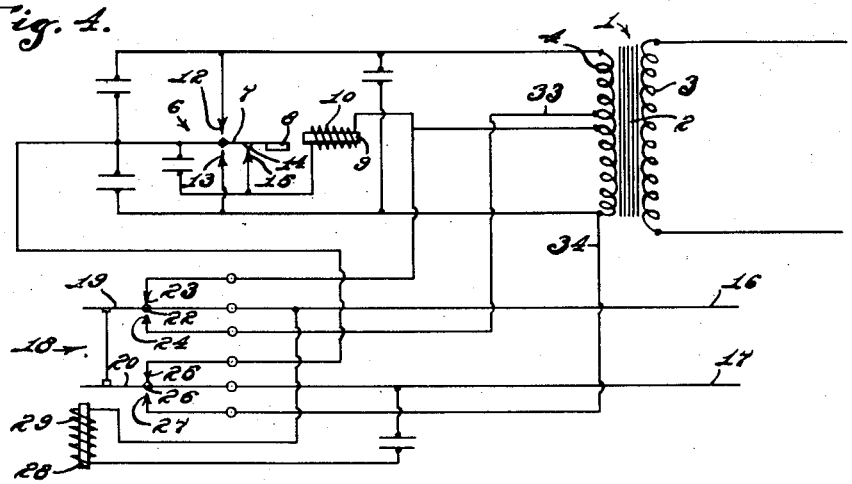
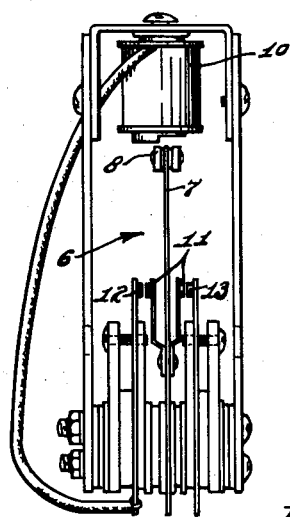
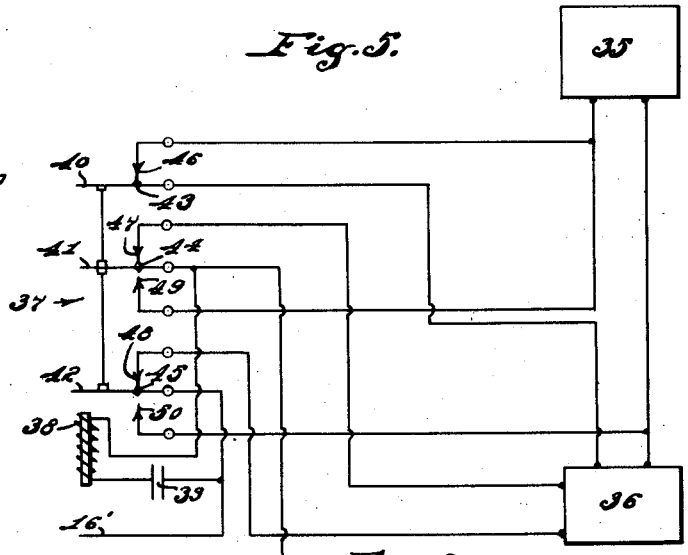
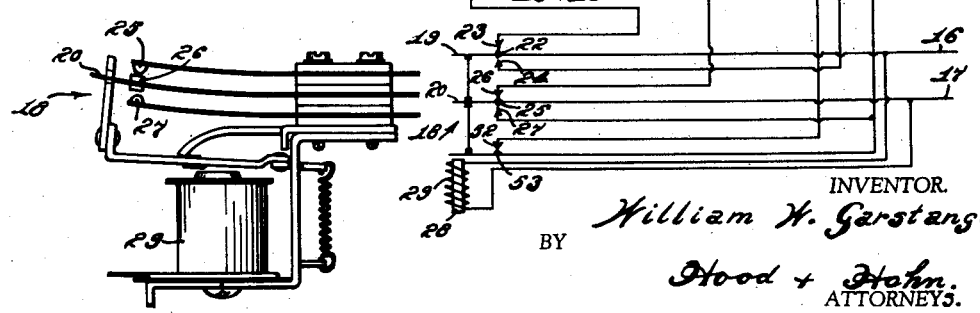

Patented Apr. 26, 1938

2,115,162

UNITED STATES PATENT OFFICE 2,115,162

UNIVERSAL CONVERTER

William W. Garstang, Indianapolis, Ind.

Application April 28, 1937, Serial No. 139,388

8 Claims. (Cl. 171—97)

My invention relates to improvements to electric converters or transformers for delivering current of a predetermined character to a load when the device is connected to a power line.

One of the objects of my invention is to deliver a current of predetermined characteristics, said characteristic remaining the same, irrespective of the current of the power line. More specifically, my invention relates to a device of the converter-transformer type for delivering alternating current, irrespective of whether the device is connected to a direct current power line or an alternating current power line.

Another object of my invention is to provide an apparatus which will automatically deliver to the load alternating current, irrespective of the character of current delivered by the power line and without any attention or any switching being done on the part of the operator.

In certain types of apparatus now on the market, the apparatus will only operate on alternating current. It is, however, frequently necessary and desirable to operate these devices from a direct current line and to accomplish this result, it has been necessary to provide a converter for converting the direct current into alternating current for delivery to the alternating current operated device. These A. C. devices, therefore, are provided with converters which need to be introduced between the direct current line and the device when the device is operated from a direct current line. These devices quite frequently are operated by persons unskilled in the electrical art and, therefore, in those devices where a converter is provided, it becomes necessary for the operator to manipulate a switch or some other disconnecting device when the apparatus is operated from an alternating current line. With operators unfamiliar with the characteristics of the line from which the device is to be operated or not skilled in the electrical art, very frequently such switches are not manipulated correctly.

It is, therefore, one of the objects of my invention to provide a device which may be, if desired, permanently incorporated in an apparatus requiring alternating current for its operation and which will automatically respond to deliver alternating current, irrespective of the character of the power line to which it is connected.

For the purpose of disclosing my invention, I have illustrated certain embodiments thereof in the accompanying drawings, in which:

Fig. 4 is a diagrammatic view of a further modification;

Fig. 5 is a diagrammatic view of another modification;

Fig. 6 is a side elevation of a vibrator used in the embodiment of my invention;

Fig. 7 is a side elevation of a relay used in my invention; and

Fig. 8 is a diagrammatic view of a further modification.

Figure 1:
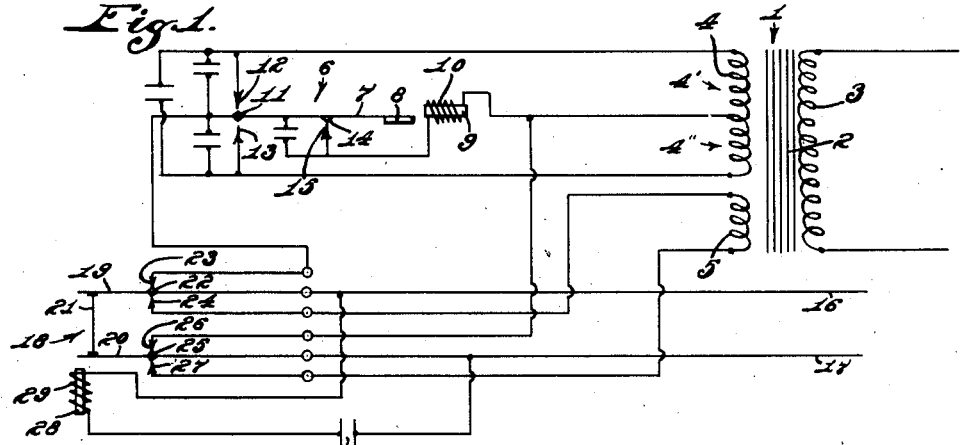
Fig. 1 is a diagrammatic view of a circuit arrangement embodying my invention.

In the embodiment illustrated in Fig. 1, I provide a transformer 1 having the usual iron core 2 and the secondary winding 3 having its terminals connected to the load lines. For the primary coil of the transformer, I provide two sets of coils, one comprising the center tapped primary coil 4 and the other a supplementary coil 5. For controlling the center tapped coil 4, I provide a vibrator switch 6 which includes a vibrator reed 7 having an armature 8 on the end thereof and adapted to be influenced by the electromagnet 9 having an operating coil 10. This reed 7 is provided with a contact 11 adapted to alternately engage a pair of relatively stationary contacts 12 and 13 and with an additional contact 14 adapted to have a make and break contact with the stationary contact 15. The vibrating reed and the coil of the electromagnet 10 are so arranged in the circuit of the center tapped primary 4 that, upon the admission of current thereto from the power line or source of supply, including the conductors 16 and 17, the contacts 14 and 15 being normally closed, the electromagnet will first be energized, causing the reed 7 to close contacts 11 and 12 and the current to pass through one side 4' and in one direction of the primary coil 4. The movement of the reed 7, however, under the influence of the magnet 9 opens the contacts 14 and 15 thus open-circuiting the coil 10 of the magnet 9, permitting the reed to swing in an opposite direction to engage contact 11 with contact 13, thereby establishing a circuit through the winding 4" of the coil 4 in the opposite direction. The electromagnet winding 10 being reenergized, the electromagnet will again cause the vibrator reed to swing in the opposite direction. It will thus be seen that the vibrating reed is set in motion and, as a result, the alternating current is set up in the primary winding 4 which through induction is set up in the secondary and delivered to the load.

In the circuit of the above-described vibrator circuit and associated parts, I provide a relay 18 which comprises a pair of switch arms 19 and 20 connected by an insulated cross bar 21 so that the arms will move in unison. The arm 19 is provided with a contact 22 adapted to alternately engage the stationary contacts 23 and 24. The arm 20 is likewise provided with a contact 25 adapted to alternately engage the stationary contacts 26 and 27. This relay switch is operated by an electro-magnet 28 having a winding 29 connected to the supply lines 16 and 17 and arranged in the circuit of the winding 29 is a condenser 30 which effectually prevents the passage of direct current through the winding 29 of the electromagnet. Therefore, if the supply lines 16 and 17 are connected to a source of direct current, the electromagnet will be unaffected and the switch 18 will remain in the position indicated in the drawings. As a result, the direct current will operate the vibrator in such a manner as to cause the primary winding to set up and induce alternating current in the secondary winding and, therefore, deliver to the load an alternating current.

The condenser 30, however, will not materially decrease the passage through the winding 29 of an alternating current. Therefore, when the supply lines 16 and 17 are connected to a source of alternating current, the winding 29 of the electromagnet will be energized causing the electromagnet to operate the relay 18 and moving the contacts 22 and 25 respectively into engagement with the contacts 24 and 27. As a result, circuit will be closed through the winding 5 and the device will operate merely as a transformer, delivering alternating current to the load.

Figure 2:
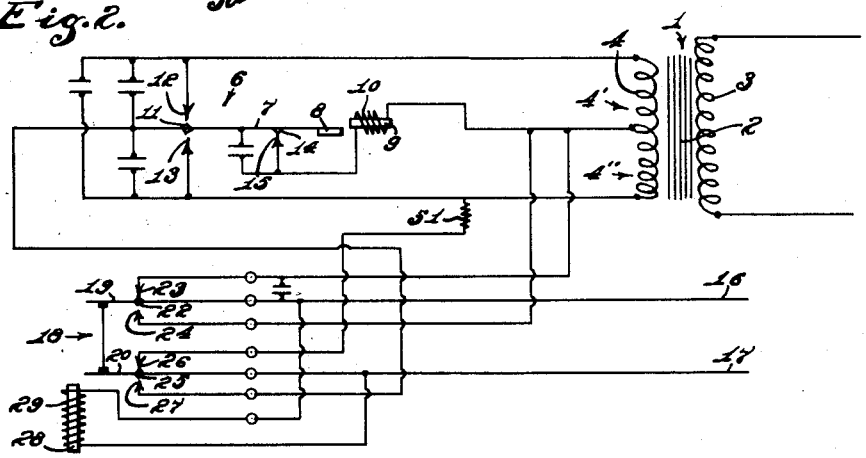
Fig. 2 is a diagrammatic view of a modification thereof.

In the arrangement illustrated in Fig. 2, I have illustrated a modification wherein the coil 5 has been dispensed with. In this structure, the electromagnetic winding 29 of the electromagnet 28, instead of being responsive to alternating current, is responsive to direct current. Therefore, in event the supply lines 16 and 17 are connected to a direct current source of supply, the relay 18 will be operated to establish a circuit through the vibrator 6, thus alternately closing the circuit through the sections 4' and 4'' in opposite directions of the winding 4 and an alternating current will be delivered to the load. In this connection, I introduce in the circuit the resistance 51 which will limit the current and protect the winding of the transformer 4 until the relay operates.

However, due to the fact that the electromagnet 28' of the structure illustrated in Fig. 2 is responsive only to direct current and not responsive to alternating current, if the supply lines 16 and 17 are connected to a source of alternating current, the relay 18' will remain unchanged and in the condition illustrated in the drawings, therefore providing for a flow of current through the section 4'' of the winding 4, and the device will merely act as a transformer with the winding 4'' acting as the primary.

Figure 3:
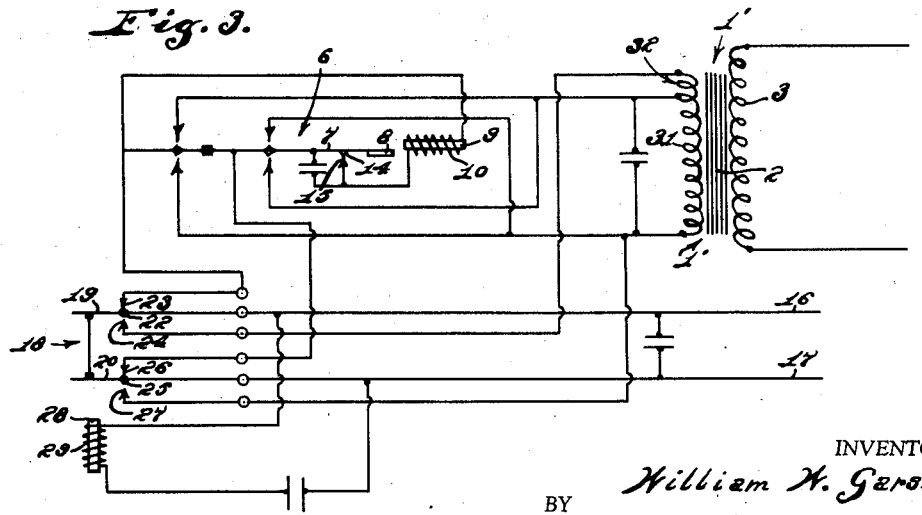
Fig. 3 is a diagrammatic view of a still further modification.

In Fig. 3, I have illustrated a further modification which is quite similar to the structure illustrated in Fig. 1 in that the winding 29 of the electromagnet, operating the relay 18 is responsive to alternating current but is not responsive to direct current. In this structure, however, the converter transformer 1' is somewhat modified. In this structure, the winding 31, instead of being a center tapped winding, as in the structure illustrated in Fig. 1, is connected at its ends to the vibrator 6 in such a manner that the device will act as a polarity changer and current will be alternately passed through the complete winding 31, in opposite directions, on each swing of the vibrator reed. However, when the device is connected to an alternating current supply, it will be noted that the winding 32, in addition to the winding 31, is included in the circuit and, therefore, when the device operates as a transformer, both the windings 31 and 32 are employed in order to provide an equal output voltage for either A. C. or D. C. operation of the device.

The ratio of windings 31 and 32 or 4 and 5 in Fig. 1, depend upon the D. C. voltage for which the device has been designed, it being desirable to maintain the same A. C. output voltage on either A. C. or D. C. input.

In Fig. 4, I have illustrated further modifications wherein the converter-transformer 1 has a somewhat different characteristic than that illustrated in Fig. 1. In this figure, so far as the circuit of the winding 29 and the vibrator circuit 6 are concerned, the structure is the same. However, in this figure, the center tapped transformer winding of the type illustrated in Fig. 1 is used but, instead of providing the primary A. C. coil 5, as in Fig. 1, I provide a section of the center tapped winding 4 which is embraced between the conductors 33 and 34, thereby increasing the number of turns in the primary winding when the device is operated as a transformer with the operation of the relay switch 18.

In Fig. 5, I have illustrated a further modification of my invention. In this structure, I have illustrated a load 35 of any character for operation on alternating current, and a converter 36 of any character, such as a rotary converter, tube inverter, or vibrator converter, as described. In connection with the converter and the load, I provide a relay 37 operated by an electromagnet having a coil 38 having arranged in series therewith a condenser 39 which prevents the passage therethrough of direct current. The relay 37 is provided with a plurality, three, of switch arms 40, 41 and 42, having respectively mounted thereon contacts 43, 44 and 45. The contact 43 is normally in engagement with the contact 46. The contacts 44 and 45 are respectively normally in engagement with contacts 47 and 48, although when the relay is operated under the influence of the electromagnet, contacts 44 and 45 will respectively engage stationary contacts 49 and 50. With the arrangement as illustrated in this figure, when the supply lines 16' and 17' are connected with the direct current, the relay 37 will not be operated, due to the fact that the current cannot, in view of the condenser 39, pass through the winding 38. Therefore, direct current will flow to the converter 36 through the relay switch contacts and it will be converted into alternating current to be delivered to the alternating current load 35. However, if the supply lines 16' and 17' are connected to an alternating current supply, the electromagnet will be influenced by the alternating current to operate the relay 37 opening, breaking the circuit between contacts 43 and 46 as well as between 44 and 47 and between 45 and 48, and establish the circuit through contacts 49 and 44 and 45 and 50. This establishes a direct path for the alternating current to the alternating current load 35, cutting out entirely the converter 36.

In Fig. 6, I have illustrated a structure wherein, instead of delivering an alternating current through the transformer as is provided in Figs. 1 to 3 inclusive, when alternating current energizes the winding 29 of the magnet 28, as in the structure illustrated in Fig. 1, the load circuit is connected directly to the supply circuit. In this structure, in order to accomplish this result, I provide an additional switch having the contact 52 normally in engagement with the switch 53 whereby when alternating current is delivered through the medium of the transformer, the secondary winding 3 will be connected with the load circuit. As soon, however, as the electromagnet 28 is energized by an alternating current delivered from the source of supply, this switch will be operated with the remaining switch arms and the alternating current supply will be connected directly with the load.

It will be noted that in substance, I have provided a structure wherein the conductors 16 and 17 may be considered as terminals adapted to be connected to a source of current supply, the circuit of the vibrator 6 and the associated windings 4 or 31 of the transformer may be considered as means for converting a direct current into an alternating current and that the conductors leading from the secondary winding of the transformer may be considered as terminals adapted to be connected to a load requiring an alternating current supply, the relay 18 and the operating electromagnet 28 constituting means for selectively connecting the terminals adapted for connection to the supply through the means for converting direct current into alternating current with alternating current terminals or for connecting the supply current with the alternating current terminals to deliver to said alternating current terminals an alternating current supplied from said supply source.

I claim as my invention:

1. The combination with a circuit, including means for converting a direct current into alternating current, of a circuit for delivering alternating current, a single supply circuit adapted to receive either direct or alternating current from a source of supply, and means responsive to current of one characteristic only for selectively controlling the establishment of a circuit from said supply circuit through said circuit including the converter, or through said alternating current circuit, in accordance with the character of the current imposed on said supply circuit.

2. The combination with a circuit, including means for converting a direct current to alternating current, of a circuit for delivering an alternating current without conversion, a single supply circuit adapted to receive either direct current or alternating current from a source of supply, and a switch for selectively controlling the establishment of current through said circuit, including the converter, or through said alternating current circuit from said supply circuit, and means responsive only to current of one characteristic only for operating said switch.

3. The combination with a circuit, including means for converting direct current to alternating current, of a circuit delivering alternating current unconverted, a supply circuit adapted to receive either direct or alternating current from a source of supply, a switch for selectively controlling the establishment of current from said supply circuit through either of said circuits, and an electromagnet responsive to current of one characteristic only for operating said switch in accordance with the character of the current impressed on said supply circuit.

4. The combination with a transformer, having primary windings and secondary windings, of a supply circuit adapted to be connected with a source of either alternating current or direct current supply, a circuit adapted for connection with said supply circuit, including at least a portion of said primary windings, and a vibrator switch for alternately closing the circuit through portions of said primary windings in opposite directions, a second circuit including a portion of said primary windings, and a switch for selectively controlling the connection of said first-mentioned circuit to said supply circuit or said second-mentioned circuit to said supply circuit, and means responsive to current of one characteristic only for controlling the operation of said switch.

5. The combination with a transformer, having primary windings and secondary windings, of a circuit including at least a portion of said primary windings and including a vibrator switch for alternately closing the circuit through portions of said primary windings in opposite directions, a second circuit including at least a portion of said primary windings, a supply circuit, a switch in said supply circuit for selectively controlling the connection of either of said first-mentioned circuits with said supply circuit and an electromagnet responsive only to current of one characteristic for operating said switch.

6. The combination with a transformer having primary windings and secondary windings, of a supply circuit adapted for connection with a source of either direct or alternating current, a circuit including at least a portion of said primary windings and a vibrator for alternately closing the circuit through at least portions of said primary winding in opposite directions, a second circuit including at least a portion of said primary winding, a switch for selectively controlling the establishment of a connection between either of said circuits with said supply circuit and an electromagnet connected in said supply circuit and responsive to current of one characteristic only for operating said switch.

7. The combination with terminals adapted to be connected to a source of current supply and terminals adapted to be connected to a load requiring alternating current supply of means interposed between said terminals for transforming a direct current to an alternating current, means for selectively connecting said supply terminals through said converter means with the alternating current terminals or for connecting the supply current with the alternating current terminals to deliver the same current supply to said supply terminals to the alternating current terminals.

8. The combination with a circuit including means for converting a direct current into alternating current, of a circuit for delivering alternating current, a supply circuit adapted to receive either direct or alternating current from a source of supply, means responsive to current of one characteristic only for selectively controlling the establishment, of a circuit from said supply circuit through said circuit including the converter or through the alternating current circuit, in accordance with the character of current imposed on said supply circuit, and means for maintaining the alternating current output voltage from said converter relatively constant.

WILLIAM W. GARSTANG.